United States Patent
Lin et al.

(10) Patent No.: US 10,326,955 B1
(45) Date of Patent: Jun. 18, 2019

(54) IMAGE SENSOR READOUT CIRCUITRY INCLUDING ANALOG-TO-DIGITAL CONVERSION WITH HYBRID COUNTER STRUCTURE

(71) Applicant: OmniVision Technologies, Inc., Santa Clara, CA (US)

(72) Inventors: Yingkan Lin, San Jose, CA (US); Charles Wu, Palo Alto, CA (US); Yu-Shen Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/872,709

(22) Filed: Jan. 16, 2018

(51) Int. Cl.
*H04N 5/378* (2011.01)
*H04N 5/369* (2011.01)
*H04N 5/3745* (2011.01)
*H04N 5/376* (2011.01)

(52) U.S. Cl.
CPC ........... *H04N 5/3698* (2013.01); *H04N 5/378* (2013.01); *H04N 5/3765* (2013.01); *H04N 5/37455* (2013.01)

(58) Field of Classification Search
CPC ....................................................... H04N 5/378
USPC ................................................. 348/294, 302
See application file for complete search history.

(56) References Cited

U.S. PATENT DOCUMENTS

| 7,440,534 | B2 * | 10/2008 | Morimura | ........ | H03K 3/356156 |
| | | | | | 327/202 |
| 7,629,913 | B2 | 12/2009 | Okumura | | |
| 8,576,979 | B2 | 11/2013 | Mo et al. | | |
| 9,473,722 | B2 | 10/2016 | Iwaki | | |
| 2007/0075888 | A1 * | 4/2007 | Kelly | .................... | H03M 1/145 |
| | | | | | 341/155 |
| 2015/0028190 | A1 * | 1/2015 | Shin | ....................... | H03K 21/38 |
| | | | | | 250/208.1 |
| 2015/0381911 | A1 * | 12/2015 | Shen | ...................... | H04N 5/378 |
| | | | | | 348/241 |
| 2017/0257591 | A1 * | 9/2017 | Kobuse | ................ | H04N 5/3655 |

OTHER PUBLICATIONS

Jeri Ellsworth, Static vs. Dynamic Flip Flops—Race Against the Clock, Nov. 24, 2012, YouTube, https://www.youtube.com/watch?v=y1w6Nskbx8E&t=88s (Year: 2012).*

\* cited by examiner

*Primary Examiner* — Anthony J Daniels
(74) *Attorney, Agent, or Firm* — Christensen O'Connor Johnson Kindness PLLC

(57) ABSTRACT

A readout circuit for use with an image sensor includes a comparator coupled to compare a ramp signal from a ramp generator with an output signal from a pixel of a pixel array. A counter is coupled to the comparator to count until the comparator detects that a ramp signal value has reached an output signal value. The counter includes K cascade-coupled dynamic flip-flop circuits to generate the K least significant bits (LSBs) of the N-bit output of the counter. The counter also includes N-K cascade-coupled static flip-flop circuits to generate the N-K most significant bits (MSBs) of the N-bit output of the counter. A latch is coupled to the counter to store a count value generated by the counter after the ramp signal value has reached the output signal value.

18 Claims, 4 Drawing Sheets

IMAGE SENSOR READOUT CIRCUITRY INCLUDING ANALOG-TO-DIGITAL CONVERSION WITH HYBRID COUNTER STRUCTURE

BACKGROUND INFORMATION

Field of the Disclosure

This disclosure relates generally to image sensors, and in particular but not exclusively, relates to analog-to-digital conversion in image sensors.

Background

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Image sensors conventionally receive light on an array of pixels, which generates charge in the pixels. The intensity of the light may influence the amount of charge generated in each pixel, with higher intensity generating higher amounts of charge. The charge may be converted into a digital representation of the charge by analog-to-digital converter (ADC) circuits in the image sensor based on a comparison of a signal generated by each pixel to a reference voltage signal. In some examples, counter circuits are used to generate the digital outputs of the ADC circuits. As the pixel densities and frame rates in image sensors increase, the amount of electrical currents consumed by known counter circuits has increased dramatically. In addition, new shift-register based data transmission structures consume an order of magnitude less current, resulting in the overall percentage of the relative current consumed by known counter structures to increase dramatically. Consequently, the large relative current consumption of known counter structures during counter operation results large power losses, which reduce the power efficiency of image sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
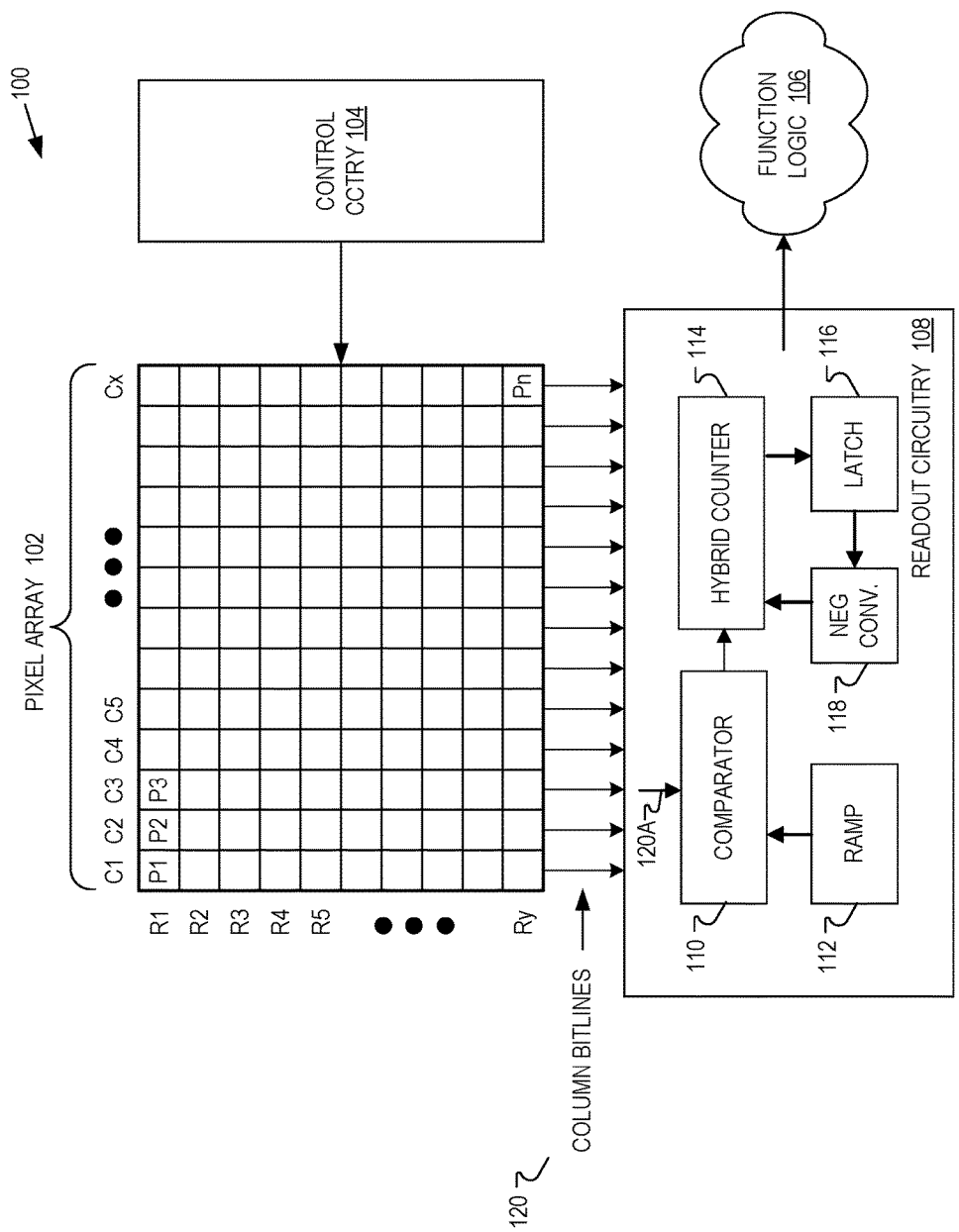
FIG. 1 illustrates one example of an imaging system including readout circuitry that utilizes an example hybrid counter in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of image sensor readout circuits including hybrid counter circuit are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

To illustrate, FIG. 1 shows one example of an imaging system 100 in accordance with an embodiment of the present disclosure. As shown in the depicted example, imaging system 100 includes pixel array 102, control circuitry 104, readout circuitry 108, and function logic 106. In one example, pixel array 102 is a two-dimensional (2D) array of photodiodes, or image sensor pixels (e.g., pixels P1, P2 . . . , Pn). As illustrated, photodiodes are arranged into a plurality of rows (e.g., rows R1 to Ry) and a plurality of columns (e.g., column C1 to Cx) to acquire image data of a person, place, object, etc., which can then be used to render a 2D image of the person, place, object, etc. It is appreciated, however, that the pixels or photodiodes of pixel array 102 do not necessarily have to be arranged into rows and columns, and may also take other configurations.

In one example, an image is focused onto pixel array 102, and after each image sensor photodiode/pixel in pixel array 102 has acquired its image charge through photogeneration of the image charge in response to incident light, corresponding image data is read out by readout circuitry 108 and then transferred to function logic 106. Readout circuitry 108 may be coupled to read out image data from the plurality of photodiodes in pixel array 102 through column bitline outputs 120.

In one example, control circuitry 104 is coupled to pixel array 102 to control operation of the plurality of photodiodes in pixel array 102. For example, control circuitry 104 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, imaging system 100 may be included in a digital camera, cell phone, laptop computer, or the like. Additionally, imaging system 200 may be coupled to other pieces of hardware such as a processor (general purpose or otherwise), memory elements, outputs (USB port, wireless transmitter, HDMI port, etc.), lighting/flash, electrical input (keyboard, touch display, track pad, mouse, microphone, etc.), and/or display. Other pieces of hardware may deliver instructions to imaging system 200, extract image data from imaging system 100, or manipulate image data supplied by imaging system 100.

In various examples, readout circuitry 108 may include amplification circuitry, analog-to-digital (ADC) conversion circuitry, or otherwise. In the illustrated example, a ramp generator circuit 112 and a comparator 110 may be included in the readout circuitry 108 to perform the analog-to-digital conversion. In some embodiments, there may be a comparator 110 coupled to each column bitline output 120 from pixel array 102, and the ramp generator circuit 112 provides a reference voltage ramp signal to each comparator 110 to perform the analog-to-digital conversion of the analog output signal read out from column bitline outputs 120 from the pixel array 102.

For instance, in the depicted example, comparator 110 is coupled to compare the output signal of a pixel received through a column bitline output 120A and a ramp signal from ramp generator 112. When the comparison begins, the hybrid counter 114, which is coupled to comparator 110, is configured to begin counting at a known frequency, which effectively times how long it takes for the ramp signal to reach the output signal value to convert the analog output to a digital value. As will be discussed, in one example, hybrid counter 114 is enabled in response to a count enable signal to count during a ramp event of the ramp signal until the comparator detects 114 that a ramp signal value from the ramp generator 112 has reached the output signal value from column bitline output 120A. Thus, when the ramp signal from the ramp generator 112 reaches the value of the output signal, the value in the hybrid counter 114 is the analog-to-digital converted value of the output signal from column bitline output 120A.

As will be discussed in greater detail, in the depicted example, hybrid counter 114 with a ripple counter structure that includes a combination of both dynamic flip-flop as well as static flip-flop circuits to reduce current consumption in accordance with the teachings of the present invention. In the depicted example, as soon as the comparison and counting operations of comparator 110 and hybrid counter 114 are complete, the digital image value from hybrid counter 114 is then stored in the latch 116 before the result in the dynamic flip-flops in hybrid counter 114 decay due to leakage current. The stored digital image data in latch 116 can then be output from readout circuitry 108 to function logic 106 for processing in accordance with the teachings of the present invention.

Function logic 106 may simply store the digital image data output from the readout circuitry 108, or even manipulate the digital image data by applying post image effects (e.g., crop, rotate, remove red eye, adjust brightness, adjust contrast, or otherwise). In one example, readout circuitry 108 may readout a row of image data at a time along readout column lines (illustrated) or may readout the image data using a variety of other techniques (not illustrated), such as a serial readout or a full parallel readout of all pixels simultaneously.

In one example, readout circuitry 108 may also be configured to perform correlated double sampling (CDS) to remove unwanted noise from image data acquired from pixel array 102. In so doing, a "black" reference image is initially read out by readout circuitry 108 prior to each acquisition of the actual image data signal from pixel array 102 by readout circuitry 108. Any signal present in the black reference image is assumed to be noise, and is therefore removed from the actual image data signal acquired from pixel array 102. The final image can therefore be determined by subtracting or removing the black image data from the actual image data signal read out from the pixel array 102.

In the example illustrated in FIG. 1, the black image data measured in hybrid counter 114 is stored in latch 116, and is then output to a negative converter 118 to be converted into a negative value. Then, prior to the analog-to-digital conversion of the actual image data read out from pixel array, the hybrid counter 114 loaded with the negative black image data value. With the hybrid counter 114 being initialized with the negative black image data value prior to converting the actual image signal, when the comparator 110 completes comparing the actual image data with the ramp signal from ramp generator 112, the final count in the hybrid counter 114 is equal to the digitized actual digital image data value minus the digitized black reference image data value, which is the desired correlated double sampled value of the digitized image data. This correlated double sampled value of the digitized image data is then output from readout circuitry 108 to the function logic 106 in accordance with an embodiment of the present disclosure.

Figure 2:
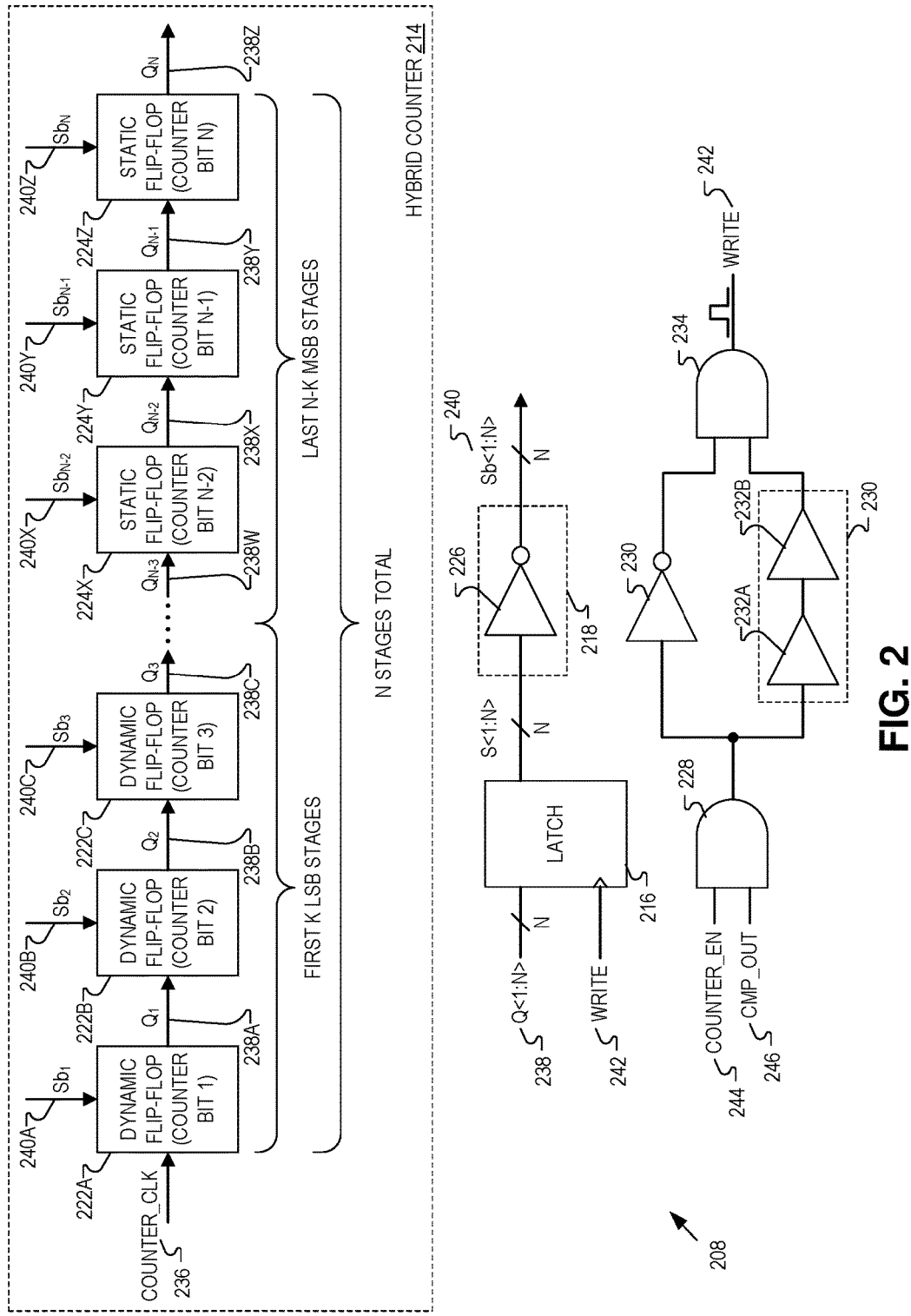
FIG. 2 is a schematic illustrating an example of a portion of readout circuitry including an example hybrid counter in accordance with an embodiment of the present disclosure.

To illustrate, FIG. 2 is a schematic illustrating one example of a portion of readout circuitry 208 including an example hybrid counter 214, a latch 216, and a negative converter 218 in accordance with an embodiment of the present disclosure. It is appreciated that readout circuitry 208, hybrid counter 214, latch 216, and negative converter 218 of FIG. 2 may be examples of readout circuitry 108, hybrid counter 114, latch 116, and negative converter 118 of FIG. 1, and that similarly named or numbered elements described above may be coupled and function similarly below.

As shown in the example depicted in FIG. 2, hybrid counter 214 is a N-bit counter implemented using a ripple counter structure with a combination of cascade-coupled dynamic flip-flops 222 and cascade-coupled static flip flops 224. The first K stages representing the least significant bits (LSBs) of the N-bit hybrid counter 214 are implemented with dynamic flip-flops. In the illustrated example, 3 cascade-coupled dynamic flip-flops 222A, 222B, and 222C are shown for explanation purposes to represent the first K LSB stages. It is appreciated of course that in other examples, K may be equal to values other than 3. The remaining N-K stages representing the most significant bits (MSBs) of the N-bit hybrid counter 214 are implemented with static flip flops 224 that are cascade coupled to the last dynamic flip flop (e.g., 222C) of the K cascade-coupled dynamic flip-flops 222. In the illustrated example, 3 cascade-coupled static flip-flops 224X, 224Y, and 224Z are shown for explanation purposes to represent the remaining N-K MSB stages.

It is appreciated of course that in other examples, N-K may be equal to values other than 3.

The power consumption of hybrid counter 214 can be approximated using the following relationship:

$$P = C_{load} V^2 f_{clk} \quad \text{(Eq. 1)}$$

where P represents power consumption, $C_{load}$ represents counter loading, V represents voltage, and $f_{clk}$ represents the counter frequency. Thus, it can be observed from Equation 1 above that reducing counter loading $C_{load}$ is an effective way to reduce power consumption P since voltage V and counter frequency $f_{clk}$ are determined by external system requirements. By including dynamic flip-flops 222 in hybrid counter 214, instead of using all static flip-flops 224 in hybrid counter 214, it is appreciated that counter loading $C_{load}$ is reduced because dynamic flip-flops consume less power than static flip-flops, which therefore reduces the overall power consumption P of hybrid counter 214 in accordance with the teachings of the present invention.

Figure 3:
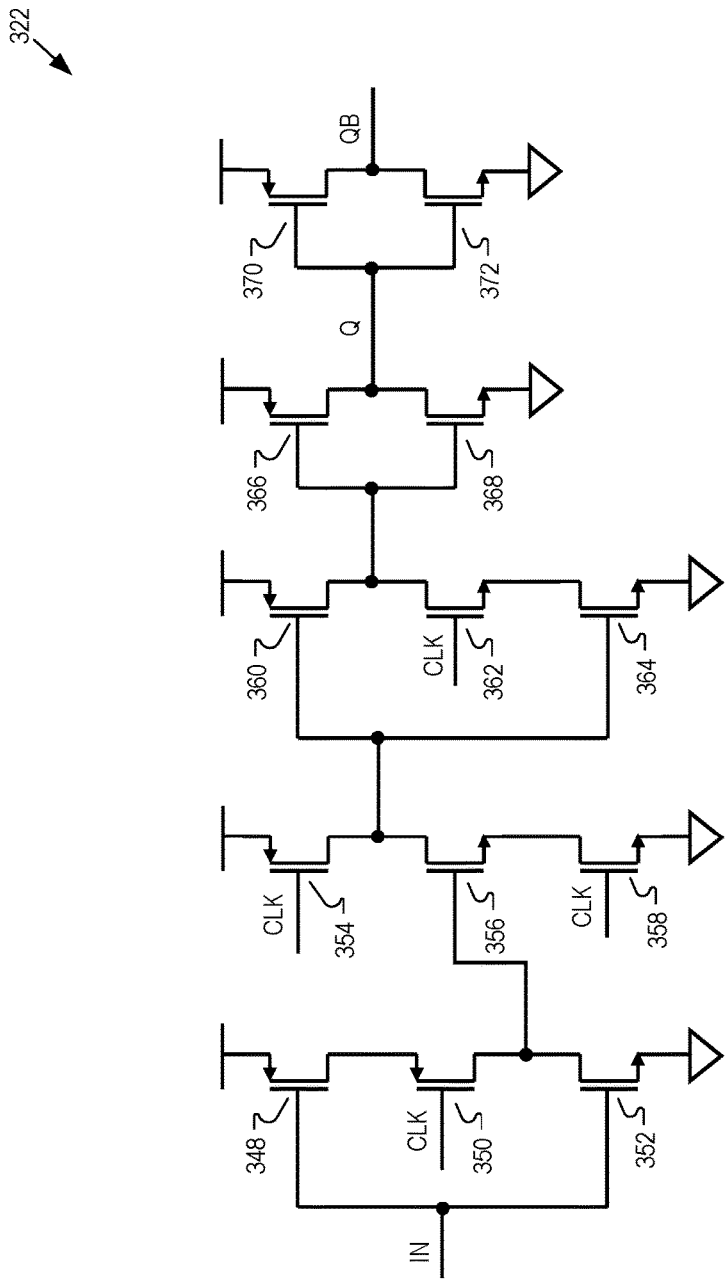
FIG. 3 is a schematic illustrating circuitry of an example dynamic flip-flop included in an example hybrid counter in accordance with an embodiment of the present disclosure.

To illustrate, FIG. 3 is a schematic illustrating circuitry of one example of a dynamic flip-flop 322 included in an example hybrid counter in accordance with an embodiment of the present disclosure. It is appreciated that dynamic flip-flop 322 of FIG. 3 may be an example of one of the dynamic flip-flops 222 of FIG. 2, or an example of a dynamic flip-flop included in hybrid counter 114 of FIG. 1, and that similarly named or numbered elements described above may be coupled and function similarly below.

For instance, as shown in the example depicted in FIG. 3, dynamic flip-flop 322 includes a first stage that includes a first p-transistor 348 cascade-coupled to a first clock p-transistor 350 cascade-coupled to a first n-transistor 352. A control terminal of the first p-transistor 348 and a control terminal of the first n-transistor 352 are coupled to receive an input IN of the dynamic flip-flop circuit 322. A control terminal of the first clock p-transistor 350 is coupled to receive a clock signal CLK.

A second stage of dynamic flip-flop 322 includes a second clock p-transistor 354 cascade-coupled to a second n-transistor 356 cascade-coupled to a first clock n-transistor 358. A control terminal of the second n-transistor 356 is coupled to receive an output of the first stage from the output of first clock p-transistor 350. A control terminal of the second clock p-transistor 354 and a control terminal of the first clock n-transistor 358 are coupled to receive the clock signal CLK.

A third stage of dynamic flip-flop 322 includes a second p-transistor 360 cascade-coupled to a second clock n-transistor 362 cascade-coupled to a third n-transistor 364. A control terminal of the second p-transistor 360 and a control terminal of the third n-transistor are coupled to receive an output of the second stage from an output of second clock p-transistor 354. A control terminal of the second clock n-transistor 362 is coupled to receive the clock signal CLK.

A fourth stage of dynamic flip-flop 322 includes a first inverter coupled to receive an output of the third stage from an output of second p-transistor 360. In the illustrated example, the first inverter is implemented with a third p-transistor 366 cascade-coupled to a fourth n-transistor 368.

A fifth stage of dynamic flip-flop 322 includes a second inverter coupled to receive an output of the fourth stage from the first inverter through an output of third p-transistor 366. In the illustrated example, the second inverter is implemented with a fourth p-transistor 370 cascade-coupled to a fifth n-transistor 372. In the example depicted in FIG. 3, the output of the first inverter through third p-transistor 366 is a first output Q of the dynamic flip-flop 322, and the output of the second inverter through the fourth p-transistor 370 is a second output QB of the dynamic flip-flop 322.

In the illustrated example, dynamic flip-flop 322 of FIG. 3 is a true single phase clock (TSPD) dynamic D flip-flop circuit. As such, it is appreciated that flip-flop 322 has dynamic flip-flop design with a single phase clock CLK to increase clock frequency, reduce skew problems, and reduce power consumption. In comparison, each static flip-flop 224 of FIG. 2 has 24 transistors, while the example dynamic flip-flop 322 illustrated in FIG. 3 has just 13 transistors. Therefore, using dynamic flip-flop 322 in column hybrid counters 114 or 214, roughly cuts the loading of the counters in half compared to using ripple counters implemented with only static flip flops 224.

It is noted however, that dynamic flip-flop 322 also has the requirement of a minimum switching frequency due to its dynamic nature. If the clock CLK is too slow or there is no clock input for a period of time, the value of stored in dynamic flip-flop 322 may decay and be lost due to leakage current. In the case of a ripple counter, the clock frequency of each stage is half of the frequency of its previous stage. Therefore, referring back to FIG. 2, the first K LSB stages of hybrid counter 214 are implemented with dynamic flip-flops 222 which switch more frequently when counting, and the remaining last N-K MSB stages are implemented with static flip-flops 224, which switch less frequently when counting. In the depicted example, the clocking frequency of the last one of the K cascade-coupled dynamic flip-flop circuits (e.g., dynamic flip-flop 222C in FIG. 2) during a counting operation of the hybrid counter 214 is still greater than the minimum switching frequency of the dynamic flip-flop circuits 222 to prevent data loss in accordance with the teachings of the present invention.

To that end, the example illustrated in FIG. 2 also illustrates that a latch 216 coupled to read out and store the N-bit final count value Q<1:N> 238 generated by the hybrid counter 214 in response to a pulse in a write signal 242. Each bit of count value Q<1:N> 238 is generated by a respective output $Q_1$ 238A, $Q_2$ 238B, $Q_3$ 238C, ... $Q_{N-2}$ 238X, $Q_{N-1}$ 238Y, $Q_N$ 238Z from a respective stage or dynamic/static flip-flop 222A, 222B, 222C, ... 224X, 224Y, 222Z of the hybrid counter 214. As shown in the depicted example, the pulse in write signal 242 is generated in response to a counter enable signal COUNTER_EN 244 and a comparator output ready signal CMP_OUT 246. In one example, an AND gate 228 is coupled to receive counter enable signal COUNTER_EN 244 and comparator output ready signal CMP_OUT 246. An inverter 230 and a delay circuit 230 are coupled to the output of AND gate 228. In one example, the delay circuit 230 includes one or more buffer circuits 232A and 232B coupled in series as shown. An AND gate 234 is coupled to the outputs of inverter 230 and delay circuit 230 to generate the pulse of write signal 242. In the illustrated example, the duration of the pulse of write signal 242 is determined in response to the delay of delay circuit 230.

In operation, the counter enable signal COUNTER_EN 244 is enabled or logic high when the hybrid counter 214 is enabled to count during an analog-to-digital conversion operation, which occurs at the same time as a ramp signal event in the ramp signal of ramp generator 112. The comparator output ready signal CMP_OUT 246 is triggered in response to the ramp signal from ramp generator 112 reaching the analog output signal value being converted to digital.

Figure 4:
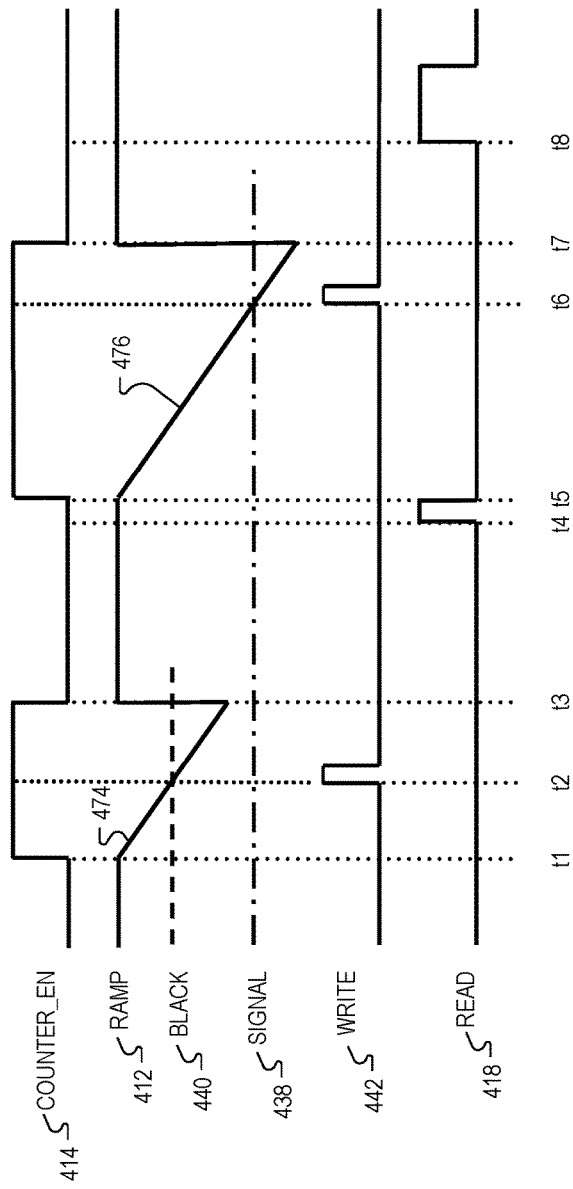
FIG. 4 is a timing diagram illustrating waveforms associated with an example hybrid counter in accordance with an embodiment of the present disclosure.

To illustrate, FIG. 4 is a timing diagram illustrating waveforms associated with an example hybrid counter in accordance with an embodiment of the present disclosure. It is appreciated that hybrid counter that the waveforms of FIG. 4 are associated with may be examples of waveforms that are associated with hybrid counter 214 of FIG. 2 or hybrid counter 114 of FIG. 1, and that similarly named or numbered elements described above may be coupled and function similarly below.

In the example depicted in FIG. 4, COUNTER_EN 414 represents a counter enable signal that is enabled or logic high when the hybrid counter (e.g., hybrid counter 214) is initially enabled at time t1 to begin counting during and analog-to-digital conversion operation, which occurs during the ramp signal event 474 in the ramp signal RAMP 412 of ramp generator (e.g., ramp 112). When ramp voltage of ramp signal 412 reaches the black level 440 at time t2 as shown, the comparator (e.g., comparator 110) generates the output ready signal (e.g., CMP_OUT 246) which causes the pulse in write signal 442 (see also write signal 242) to occur. In one example, the hybrid counter 214 may stop counting at time t2 to save further power.

Referring briefly back to FIG. 2, the pulse that occurs in write signal 242 at time t2 causes latch 216 to read and store the output signal Q<1:N> 238 from hybrid counter 214. In the example, the output signal Q<1:N> 238 from hybrid counter 214 is stored into latch 216 before the data in hybrid counter 214 decays or is lost due to leakage currents in the dynamic flip-flops. FIG. 2 also shows that the saved output signal Q<1:N> 238 is output from latch 216 as signal value S<1:N>. In a correlated double sampling example, the signal value S<1:N> that is obtained at time t2 actually represents the digital black signal level. As such, the negative converter circuit 218 converts the digital black signal level to a negative black signal Sb<1:N> 240.

In one example, negative converter circuit 218 includes an N-bit inverter 226, which complements or toggles all of the bits of the positive binary signal value S<1:N> to generate a negative black signal Sb<1:N> 240. It is appreciated that by inverting all of the bits of signal value S<1:N> with N-bit inverter 226, a one's complement negative representation of signal value S<1:N> is obtained with negative black signal Sb<1:N> 240. In one example, it is appreciated also that the two's complement negative representation of binary signal value S<1:N> can also be obtained by adding one to the one's complement representation of negative black signal Sb<1:N> 240, which can be accomplished by loading the N stages of the hybrid counter 214 with the negative black signal Sb<1:N> 240 via Sb$_1$ 240A, Sb$_2$ 240B, Sb$_3$ 240C, . . . Sb$_{N-2}$ 240X, Sb$_{N-1}$ 240Y, Sb$_N$ 240Z from negative converter 218 and then pulsing the COUNTER_CLK 236.

Thus, referring back to the waveforms illustrated in FIG. 4, after time t2, the end of the COUNTER_EN 414 and the ramp event 474 occurs at time t3. In one example, it is appreciated that if the black signal value 440 is too low and is therefore less than the minimum ramp voltage of ramp signal 412, the write signal 442 will be generated when counter is disabled at time t3 in response to the falling edge of COUNTER_EN 414 to guarantee that the hybrid counter 214 results are latched into latch 216. Later, prior to the next time the counter is enabled and before to the next ramp event 476 in ramp signal 412, the hybrid counter 214 is loaded or initialized with the negative black signal Sb<1:N> 240 from negative converter 218 as described above in response to the READ signal 418, which occurs at time t4 before the hybrid counter 214 begins counting again at time t5. The negative black signal Sb<1:N> 240 loaded into latch 216 before time t5 is used to implement subtraction of the black signal from signal value (i.e., correlated double sampling).

At time t5, the counter is enabled via COUNTER_EN 414 to begin counting as the next ramp event 476 begins in ramp signal 412. When ramp signal 412 voltage has reached the signal value SIGNAL 438 at time t6, the comparator (e.g., comparator 110) generates the output ready signal (e.g., CMP_OUT 246) again, which causes the pulse to occur again in write signal 442 (see also write signal 242) to occurs. In one example, the hybrid counter 214 may stop counting at time t6 to further save power. Thus, at time t6, the pulse that occurs in write signal 442 causes latch 216 to read and store the output signal Q<1:N> 238 from hybrid counter 214, which is output from latch 216 as the final signal value S<1:N>.

In the example, the output signal Q<1:N> 238 from hybrid counter 214 is stored into latch 216 before the data in hybrid counter 214 decays or is lost due to leakage currents in the dynamic flip-flops. Since the hybrid counter 214 was initialized with the negative black signal Sb<1:N> 240, the final signal value saved in latch 216 after time t6 is the correlated double sampled value.

At time t7, the counter is no longer enabled via COUNTER_EN 414 and the end of the ramp event 476 occurs. In one example, it is appreciated that if the signal value 438 is too low and is therefore less than the minimum ramp voltage of ramp signal 412, the write signal 442 will be generated when counter is disabled at time t7 in response to the falling edge of COUNTER_EN 414 to guarantee that the hybrid counter 214 results are latched into latch 216. At time t8, the read signal 418 allows the saved final signal value S<1:N> to be read out from latch 216, and then forward to function logic 106 for further processing.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A readout circuit for use with an image sensor, comprising:
a comparator coupled to compare a ramp signal from a ramp generator with an output signal from a pixel of a pixel array; and
a counter coupled to the comparator, wherein the counter has N stages and an N-bit output, wherein the counter is enabled in response to a count enable signal to count during a ramp event of the ramp signal until the comparator detects that a ramp signal value has reached an output signal value, wherein the counter comprises:
K cascade-coupled dynamic flip-flop circuits, wherein the K cascade-coupled dynamic flip-flop circuits are coupled to generate K least significant bits (LSBs) of the N-bit output of the counter, wherein an input of a first one of the K cascade-coupled dynamic flip-flop circuits is coupled to receive a counter clock, wherein a clocking frequency of the last one of the K cascade-coupled dynamic flip-flop circuits during a counting operation of the counter is greater than a minimum switching frequency of the K cascade-coupled dynamic flip-flop circuits; and
N-K cascade-coupled static flip-flop circuits, wherein the N-K cascade-coupled static flip-flop circuits are coupled to generate N-K most significant bits (MSBs) of the N-bit output of the counter, wherein an output of a last one of the K cascade-coupled dynamic flip-flop circuits is coupled to an input of a first one of the N-K cascade-coupled static flip-flop circuits; and
a latch coupled to the counter to store a count value generated by the counter after the ramp signal value has reached the output signal value.

2. The readout circuit of claim 1, wherein the output signal from the pixel is one of a black pixel value or a signal pixel value, wherein the latch is coupled to store a black count value from the counter after the ramp signal value has reached the black pixel value, and wherein the latch is coupled to store a signal count value from the counter after the ramp signal value has reached the signal pixel value.

3. The readout circuit of claim 2, further comprising a negative converter circuit coupled to the latch, wherein the negative converter circuit is coupled to convert the black count value stored in the latch to a negative black count value, wherein the counter is coupled to load the negative black count value from the negative converter circuit to initialize the counter prior to generating the signal count value.

4. The readout circuit of claim 3, wherein the negative converter circuit comprises an N-bit inverter circuit coupled to invert the black count value.

5. The readout circuit of claim 1, wherein the latch is further coupled to store the count value generated by the counter in response to a write signal, wherein the write signal is generated in response to a counter enable signal and a comparator output ready signal.

6. The readout circuit of claim 1, wherein each one of the K cascade-coupled dynamic flip-flop circuits comprises a true single phase clock D flip-flop circuit, and wherein each one of the N-K cascade-coupled static flip-flop circuits comprises a static D flip-flop circuit.

7. The readout circuit of claim 6, wherein the true single phase clock D flip-flop circuit comprises:
a first stage including a first p-transistor cascade-coupled to a first clock p-transistor cascade-coupled to a first n-transistor, wherein a control terminal of the first p-transistor and a control terminal of the first n-transistor are coupled to receive an input of the true single phase clock D flip-flop circuit, and wherein a control terminal of the first clock p-transistor is coupled to receive a clock signal;
a second stage including a second clock p-transistor cascade-coupled to a second n-transistor cascade-coupled to a first clock n-transistor, wherein a control terminal of the second n-transistor is coupled to receive an output of the first stage, and wherein a control terminal of the second clock p-transistor and a control terminal of the first clock n-transistor are coupled to receive the clock signal;
a third stage including a second p-transistor cascade-coupled to a second clock n-transistor cascade-coupled to a third n-transistor, wherein a control terminal of the second n-transistor and a control terminal of the third n-transistor are coupled to receive an output of the second stage, and wherein a control terminal of the second clock n-transistor is coupled to receive the clock signal;
a first inverter coupled to receive an output of the third stage; and
a second inverter coupled to receive an output of the first inverter, wherein the output of the first inverter is a first output of the true single phase clock D flip-flop circuit, and wherein an output of the second inverter is a second output of the true single phase clock D flip-flop circuit.

8. The readout circuit of claim 1, wherein the readout circuit is one of a plurality of readout circuits coupled to the pixel array, wherein each one of the plurality of readout circuits is coupled to a respective column bitline output of the pixel array to read a respective output signal from a respective column of the pixel array.

9. The readout circuit of claim 8, wherein each column bitline output is coupled to a plurality of rows of the pixel array.

10. An imaging system, comprising:
a pixel array including a plurality of pixels arranged into a plurality of rows and a plurality of columns;
control circuitry coupled to the pixel array to control operation of the pixel array; and
a plurality of readout circuits coupled to the pixel array, wherein each one of the plurality of readout circuits is coupled to a respective column bitline output of the pixel array, wherein each one of the plurality of readout circuits comprises:
a comparator coupled to compare a ramp signal from a ramp generator with an output signal from a pixel coupled to the respective column bitline output;
a counter coupled to the comparator, wherein the counter has N stages and an N-bit output, wherein the counter is enabled in response to a count enable signal to count during a ramp event of the ramp signal until the comparator detects that a ramp signal value has reached an output signal value, wherein the counter comprises:
K cascade-coupled dynamic flip-flop circuits, wherein the K cascade-coupled dynamic flip-flop circuits are coupled to generate K least significant bits (LSBs) of the N-bit output of the counter, wherein an input of a first one of the K cascade-coupled dynamic flip-flop circuits is coupled to receive a counter clock, wherein a clocking frequency of the last one of the K cascade-coupled dynamic flip-flop circuits during a counting operation of the counter is greater than a minimum switching frequency of the K cascade-coupled dynamic flip-flop circuits; and
N-K cascade-coupled static flip-flop circuits, wherein the N-K cascade-coupled static flip-flop circuits are coupled to generate N-K most significant bits (MSBs) of the N-bit output of the counter, wherein an output of a last one of the K cascade-coupled dynamic flip-flop circuits is coupled to an input of a first one of the N-K cascade-coupled static flip-flop circuits; and
a latch coupled to the counter to store a count value generated by the counter after the ramp signal value has reached the output signal value.

11. The imaging system of claim 10, further comprising function logic coupled to the plurality of readout circuits to receive image data readout from the pixel array.

12. The imaging system of claim 10, wherein the output signal from the pixel is one of a black pixel value or a signal pixel value, wherein the latch is coupled to store a black count value from the counter after the ramp signal value has reached the black pixel value, and wherein the latch is coupled to store a signal count value from the counter after the ramp signal value has reached the signal pixel value.

13. The imaging system of claim 12, wherein each one of the plurality of readout circuits further comprises a negative converter circuit coupled to the latch, wherein the negative converter circuit is coupled to convert the black count value stored in the latch to a negative black count value, wherein the counter is coupled to load the negative black count value from the negative converter circuit to initialize the counter prior to generating the signal count value.

14. The imaging system of claim 13, wherein the negative converter circuit comprises an N-bit inverter circuit coupled to invert the black count value.

15. The imaging system of claim 10, wherein the latch is further coupled to store the count value generated by the counter in response to a write signal, wherein the write signal is generated in response to a counter enable signal and a comparator output ready signal.

16. The imaging system of claim 10, wherein each one of the K cascade-coupled dynamic flip-flop circuits comprises a true single phase clock D flip-flop circuit, and wherein each one of the N-K cascade-coupled static flip-flop circuits comprises a static D flip-flop circuit.

17. The imaging system of claim 16, wherein the true single phase clock D flip-flop circuit comprises:
   a first stage including a first p-transistor cascade-coupled to a first clock p-transistor cascade-coupled to a first n-transistor, wherein a control terminal of the first p-transistor and a control terminal of the first n-transistor are coupled to receive an input of the true single phase clock D flip-flop circuit, and wherein a control terminal of the first clock p-transistor is coupled to receive a clock signal;
   a second stage including a second clock p-transistor cascade-coupled to a second n-transistor cascade-coupled to a first clock n-transistor, wherein a control terminal of the second n-transistor is coupled to receive an output of the first stage, and wherein a control terminal of the second clock p-transistor and a control terminal of the first clock n-transistor are coupled to receive the clock signal;
   a third stage including a second p-transistor cascade-coupled to a second clock n-transistor cascade-coupled to a third n-transistor, wherein a control terminal of the second n-transistor and a control terminal of the third n-transistor are coupled to receive an output of the second stage, and wherein a control terminal of the second clock n-transistor is coupled to receive the clock signal;
   a first inverter coupled to receive an output of the third stage; and
   a second inverter coupled to receive an output of the first inverter, wherein the output of the first inverter is a first output of the true single phase clock D flip-flop circuit, and wherein an output of the second inverter is a second output of the true single phase clock D flip-flop circuit.

18. The imaging system of claim 10, wherein each column bitline output is coupled to a plurality of rows of the pixel array.

* * * * *